(12) United States Patent
Kannu et al.

(10) Patent No.: US 10,754,883 B1
(45) Date of Patent: Aug. 25, 2020

(54) SYSTEM AND METHOD FOR INSIGHT AUTOMATION FROM SOCIAL DATA

(71) Applicant: Fractal Analytics Private Limited, Mumbai (IN)

(72) Inventors: Balaji Kannu, Tirunelveli (IN); Hemanth Kumar, Mysore (IN); Shubham Mishra, Paschim Puri (IN); Veerendra Nath, Bengaluru (IN); Rahul Kalayamkulam, Panamaram Waynad (IN); Prateek Trivedi, Noida (IN)

(73) Assignee: Fractal Analytics Private Limited, Mumbai (IN)

( * ) Notice: Subject to any disclaimer, the term of this patent is extended or adjusted under 35 U.S.C. 154(b) by 0 days.

(21) Appl. No.: 16/793,770

(22) Filed: Feb. 18, 2020

(51) Int. Cl.
*G06F 16/33* (2019.01)
*G06F 16/332* (2019.01)
*G06F 16/335* (2019.01)
*G06F 16/35* (2019.01)
*G06F 40/30* (2020.01)
*G06N 20/10* (2019.01)
*G06F 16/36* (2019.01)

(52) U.S. Cl.
CPC ........ *G06F 16/3334* (2019.01); *G06F 16/335* (2019.01); *G06F 16/3329* (2019.01); *G06F 16/355* (2019.01); *G06F 16/36* (2019.01); *G06F 40/30* (2020.01); *G06N 20/10* (2019.01)

(58) Field of Classification Search
CPC ............. G06F 16/3334; G06F 16/3329; G06F 16/335; G06F 16/355; G06F 16/36; G06F 40/30; G06N 20/10

USPC ......................................................... 707/749
See application file for complete search history.

(56) References Cited

U.S. PATENT DOCUMENTS

| | | | | |
|---|---|---|---|---|
| 8,266,148 | B2* | 9/2012 | Guha | G06F 16/9535 707/737 |
| 8,417,710 | B2* | 4/2013 | Drissi | G06F 16/951 707/748 |
| 8,983,975 | B2 | 3/2015 | Kenton | |
| 9,514,156 | B2* | 12/2016 | Sundaresan | G06Q 10/00 |
| 10,061,845 | B2* | 8/2018 | Chandramouli | G06F 16/9535 |
| 2005/0102292 | A1* | 5/2005 | Tamayo | G06F 16/951 |
| 2013/0103667 | A1* | 4/2013 | Minh | H04L 51/32 707/709 |
| 2019/0370391 | A1* | 12/2019 | Ezen Can | G10L 25/51 |

OTHER PUBLICATIONS

Ravi, Kumar, et al., "A survey on opinion mining and sentiment analysis: Tasks, approaches and applications", Knowledge-Based Systems, vol. 89 Nov. 2015, pp. 14-46.*
Huang, Lijuan, et al., "Textual Analysis for Online Reviews: A Polymerization Topic Sentiment Model", IEEE Access, vol. 7, Jul. 25, 2019, pp. 91940-91945.*

(Continued)

*Primary Examiner* — Robert Stevens
(74) *Attorney, Agent, or Firm* — Wiley Rein LLP

(57) ABSTRACT

Systems and methods are provided for insight automation from content data. The system generates insights from online and offline data at scale using unsupervised or supervised machine learning algorithms. The system can further generate insight at various levels for continuous evaluation and automated promotion.

18 Claims, 12 Drawing Sheets

(56) References Cited

OTHER PUBLICATIONS

Kanakaraj, Monisha, et al., "Performance Analysis of Ensemble Methods on Twitter Sentiment Analysis using NPL Techniques", IEEE ICSC 2015, Anaheim, CA, Feb. 7-9, 2015, pp. 169-170.*
Cho, Heeryon, et al., "Data-driven integration of multiple sentiment dictionaries for lexicon-based sentiment classification of product reviews", Knowledge-Based Systems, vol. 71 Nov. 2014, pp. 61-71.*
Güven, Sinem, et al., "Understanding the Role of Sentiment Analysis in Contract Risk Classification", NOMS 2014, Krakow, Poland, May 5-9, 2014, pp. 1-6.*

* cited by examiner

Category

Sentiment Score

| | |
|---|---|
| Time Stamp | Date Time |
| Category | String |
| Keyword-1 | Float |
| Keyword-2 | Float |
| ... | |
| Keyword-n | Float |
| Need state-1 | Float |
| Need state-2 | |
| ... | |
| Need state-m | |
| Theme-1 | |
| Theme-2 | |
| ... | |
| Theme-k | Float |

Absolute mention

| | |
|---|---|
| Time Stamp | Date Time |
| Category | String |
| Keyword-1 | Float |
| Keyword-2 | Float |
| ... | |
| Keyword-n | Float |
| Need state-1 | Float |
| Need state-2 | |
| ... | |
| Need state-m | |
| Theme-1 | |
| Theme-2 | |
| ... | |
| Theme-k | Float |

Google Interest

| | |
|---|---|
| Time Stamp | Date Time |
| Category | String |
| Keyword-1 | Float |
| Keyword-2 | Float |
| ... | |
| Keyword-n | Float |
| Need state-1 | Float |
| Need state-2 | |
| ... | |
| Need state-m | |
| Theme-1 | |
| Theme-2 | |
| ... | |
| Theme-k | Float |

Need States, Themes and Keywords Relation

| | |
|---|---|
| Time Stamp | Date Time |
| Category | String |
| Keyword-1 | int |
| Keyword-2 | int |
| ... | |
| Keyword-n | int |
| Need state-1 | int |
| Need state-2 | |
| ... | |
| Need state-m | |
| Theme-1 | |
| Theme-2 | |
| ... | |
| Theme-k | int |

Relative Search Frequency Rank – Amazon search term

| | |
|---|---|
| Time Stamp | Date Time |
| Category | String |
| Keyword-1 | Float |
| Keyword-2 | Float |
| ... | |
| Keyword-n | Float |
| Need state-1 | Float |
| Need state-2 | |
| ... | |
| Need state-m | |
| Theme-1 | |
| Theme-2 | |
| ... | |
| Theme-k | Float |

FIG. 8A

Brand

Sentiment Score

| | |
|---|---|
| Time Stamp | Date Time |
| Category | String |
| Brand | String |
| Is my Brand | Boolean |
| Keyword-1 | Float |
| Keyword-2 | Float |
| Keyword-n | Float |
| Need state-1 | Float |
| Need state-2 | |
| Need state-m | |
| Theme-1 | |
| Theme-2 | |
| Theme-k | Float |

Absolute mention

| | |
|---|---|
| Time Stamp | Date Time |
| Category | String |
| Brand | String |
| Is my Brand | Boolean |
| Keyword-1 | Float |
| Keyword-2 | Float |
| Keyword-n | Float |
| Need state-1 | Float |
| Need state-2 | |
| Need state-m | |
| Theme-1 | |
| Theme-2 | |
| Theme-k | Float |

Google Interest

| | |
|---|---|
| Time Stamp | Date Time |
| Category | String |
| Brand | String |
| Is my Brand | Boolean |
| Keyword-1 | Float |
| Keyword-2 | Float |
| Keyword-n | Float |
| Need state-1 | Float |
| Need state-2 | |
| Need state-m | |
| Theme-1 | |
| Theme-2 | |
| Theme-k | Float |

Need States, Themes and Keywords Relation

| | |
|---|---|
| Time Stamp | Date Time |
| Category | String |
| Brand | String |
| Is my Brand | Boolean |
| Keyword-1 | int |
| Keyword-2 | int |
| Keyword-n | int |
| Need state-1 | int |
| Need state-2 | |
| Need state-m | |
| Theme-1 | |
| Theme-2 | |
| Theme-k | int |

Relative Search Frequency Rank - Amazon search term

| | |
|---|---|
| Time Stamp | Date Time |
| Category | String |
| Brand | String |
| Is my Brand | Boolean |
| Keyword-1 | Float |
| Keyword-2 | Float |
| Keyword-n | Float |
| Need state-1 | Float |
| Need state-2 | |
| Need state-m | |
| Theme-1 | |
| Theme-2 | |
| Theme-k | Float |

SYSTEM AND METHOD FOR INSIGHT AUTOMATION FROM SOCIAL DATA

RELATED APPLICATIONS

This application claims priority benefit of Indian Patent Application No. 201921053192, filed Dec. 20, 2019, which are incorporated entirely by reference herein for all purposes.

FIELD

The invention relates to systems and methods in the field of computer science, and in particular to the automated generation of insights from online or offline content data.

BACKGROUND ART

Over 2.5 quintillion bytes of data are created every single day at the current pace, and the pace is accelerating with the growth of social network. A lot of these data are content data and are from social media, such as social chatter. Social media is used by customers and prospects to communicate among themselves, and occasionally with companies. This communication can result in leads, sales or advocacy, but is often less structured and conversational. It can be reactive too, as social media is increasingly used as a customer support channel.

A large number of enterprises attempt to tap into such content data to understand problem areas faced by their customers, and to use such feedback to make improvements and correction. However, analyzing this data at scale to derive actionable insights for businesses is a complex computational problem. Further, most of these insights are perishable and need immediate attention and action. On the other hand, business users have a limited attention span and bandwidth to prioritize and take appropriate action against these most pressing conditions for the business. Existing enterprise analytical tools such as dashboards, etc., not only pose problems with respect to scale, but analyses using these tools are largely human-driven. Accordingly, bias and lag are introduced into the decision-making process, which leads to missed signals for opportunities and threats to business.

In order to meaningfully analyze the potentially large volume of customer feedback that a business may collect, a typical approach may predefine topics/themes relevant to a specific business function and then develop an approach to map specific customer feedback to an appropriate theme. Typical approaches to mapping feedback to themes are mapping based on rule based patterns or using machine learning techniques. Various attempts at employing machine learning techniques have so far provided limited business value. See U.S. Pat. No. 8,983,975.

There is a need for an improved technology platform and computer network implemented method to analyze the social data at a more granular level for real time sensing of behavior, needs and perception. There is a further need for a technology platform and computer network implemented method for generating insight at various levels for continuous evaluation and automated promotion.

SUMMARY OF THE INVENTION

The present invention addresses these issues by drastically shortening the data-to-action time step. With state-of-the-art machine learning algorithms and big-data processing stack, the present invention can curate insights automatically, at scale and in the most efficient way without the need for a human-in-the-loop.

Various embodiments are directed generally to data analysis and specifically to methods and systems for analysis of unstructured data and insight automation.

One embodiment may include a system for insight automation from content data, comprising:
- a non-transitory computer-readable storage medium comprising instructions that, when executed, enable a computing system to automatically generate insights from the content data, wherein the instructions comprises:
- a data processing engine configured to receive the content data from a plurality of external data sources, the data processing engine comprising:
    - a data preprocessing module configured to process unstructured content data using natural language processing algorithms to generated preprocessed data;
    - a filtering module configured to filter the preprocessed data to retrieve filtered preprocessed data;
    - a keyword extraction module configured to extract a plurality of keywords from the filtered preprocessed data;
    - a theme segmenting module configured to determine a theme within a collection of the filtered preprocessed data; and
    - a sentiment scoring module configured to classify opinions derived from the filtered preprocessed data and assign a sentiment score to the opinions;
    - wherein the data processing engine generate a master data dictionary stored in a database server;
- an insight engine configured to receive data schema of the master data dictionary and generate insights using a time series model and association rule mining module; and
- a reporting engine configured to report the insights generated by the insight engine.

A further embodiment of the present invention provides the data pre-processing module comprising noise removal, text normalization, and part-of-speech tagging. The filtering module is configured to use one or more algorithms comprising Regular expression (RegEx) approach, topic modeling, and support vector machine (SVM) algorithms. The keyword extraction module is configured to use one or more algorithms selecting from a group comprising LDA2Vec, neural attention method, topic modelling, joint sentiment topic model, and Word2Vec. The informativeness of a keyword is determined by term frequency-inverse document frequency (TF-IDF). The theme segmenting module uses an incremental clustering method. The sentiment scoring module is configured to analyze sentiment at a sentence level to obtain a sentiment of a single sentence. The sentiment scoring module applies window-based or rule-based approaches and is configured to build a pretrained model to predict sentiment.

An additional embodiment herein provides a method for insight automation from content data, comprising
- receiving, via a data processing engine, the content data from a plurality of external data sources;
- processing, via a data pre-processing module, unstructured content data using natural language processing algorithms to generated preprocessed data;
- filtering, via a filtering module, the preprocessed data to retrieve filtered preprocessed data;
- extracting, via a keyword extraction module, a plurality of keywords from the filtered preprocessed data;

determining, via a theme segmenting module, a theme within a collection of the filtered preprocessed data;

classifying, via a sentiment scoring module, opinions derived from the filtered preprocessed data and assigning a sentiment score to the opinions;

generating a master data dictionary stored in a database server;

generating, via an insight engine, insights from data schema of the master data dictionary using a time series model and association rule mining module; and reporting, via a reporting engine, the insights.

BRIEF DESCRIPTION OF THE DRAWINGS

The invention will be described in more detail below on the basis of one or more drawings, which illustrates exemplary embodiments.

FIGS. 8A-8C depict the data schema of the master data dictionary.

DETAILED DESCRIPTION OF THE EMBODIMENTS

Figure 1:
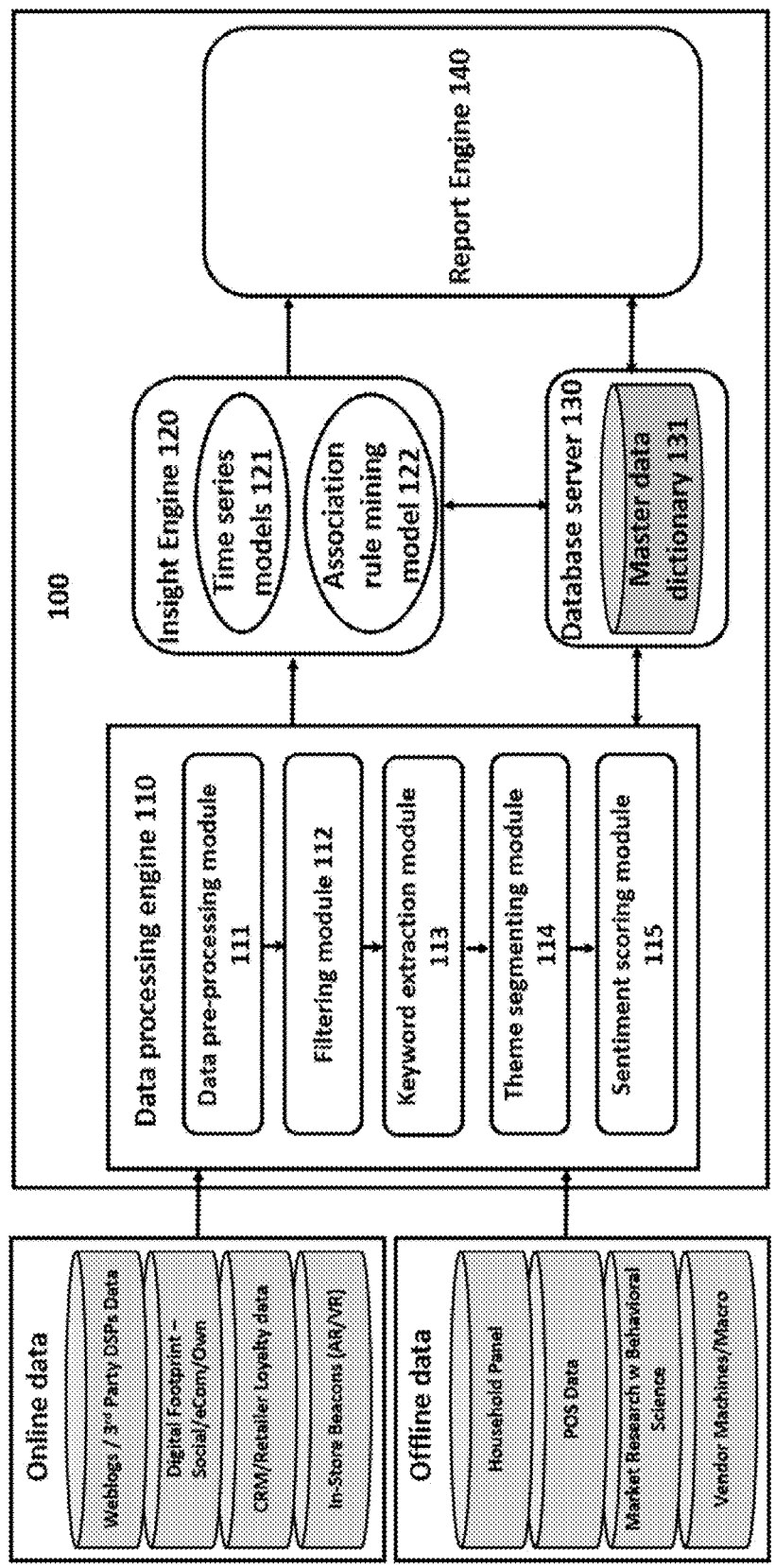
FIG. 1 depicts the components of the system for insight automation from content data.

It should be understood that this invention is not limited to the particular methodology, protocols, and systems, etc., described herein and as such may vary. The terminology used herein is for the purpose of describing particular embodiments only and is not intended to limit the scope of the present invention, which is defined solely by the claims.

As used in the specification and appended claims, unless specified to the contrary, the following terms have the meaning indicated below.

"Time Series Analysis" refers to methods for analysing time series data to extract meaningful statistics and other characteristics of the data.

"Unstructured data" may refer to documents whose content includes written human language. This may include, but is not limited to, business documents such as word processing documents, spreadsheets etc or transcripts of audio conversations or survey comments or social media posts (e.g. Twitter posts or Facebook posts).

"Deep learning" refers to a subfield of machine learning concerned with algorithms inspired by the structure and function of the brain called artificial neural networks.

"Natural language generation (NLG)" refers to the use of artificial intelligence (AI) programming to produce written or spoken narrative from a dataset.

"Unsupervised machine learning (ML)" refers to unsupervised machine learning algorithms that gather patterns from a dataset without reference to known, or labelled outcomes.

"Schema" refers to the organization of data as a blueprint of how the database is constructed (divided into database tables in the case of relational databases). The formal definition of a database schema is a set of formulas (sentences) called integrity constraints imposed on a database.

"Latent Dirichlet Allocation (LDA)" refers to a generative statistical model that allows sets of observations to be explained by unobserved groups that explain why some parts of the data are similar.

"Lemmatization" in computational linguistics is the algorithmic process of determining the lemma of a word based on its intended meaning.

"Part-of-speech tagging (PoS tagging)" is the process of marking up a word in a corpus to a corresponding part of speech, based on both its definition and its context—i.e., its relationship with adjacent and related words in a phrase, sentence, or paragraph.

"Regular expression" is a pattern describing amount of text.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments.

Figure 2:
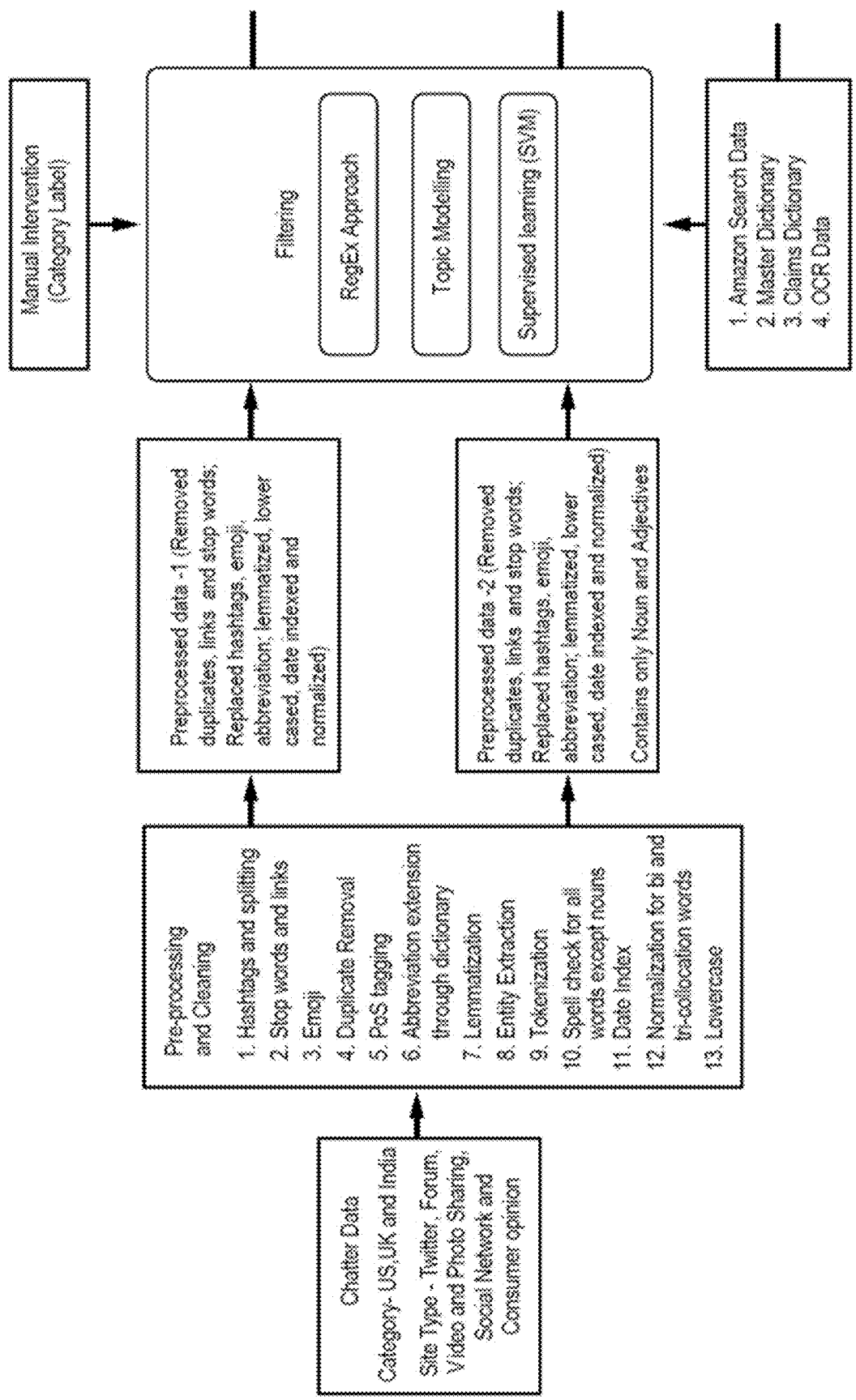
FIG. 2 details solution architecture of the natural language processing (NLP) pipeline.
Figure 2:
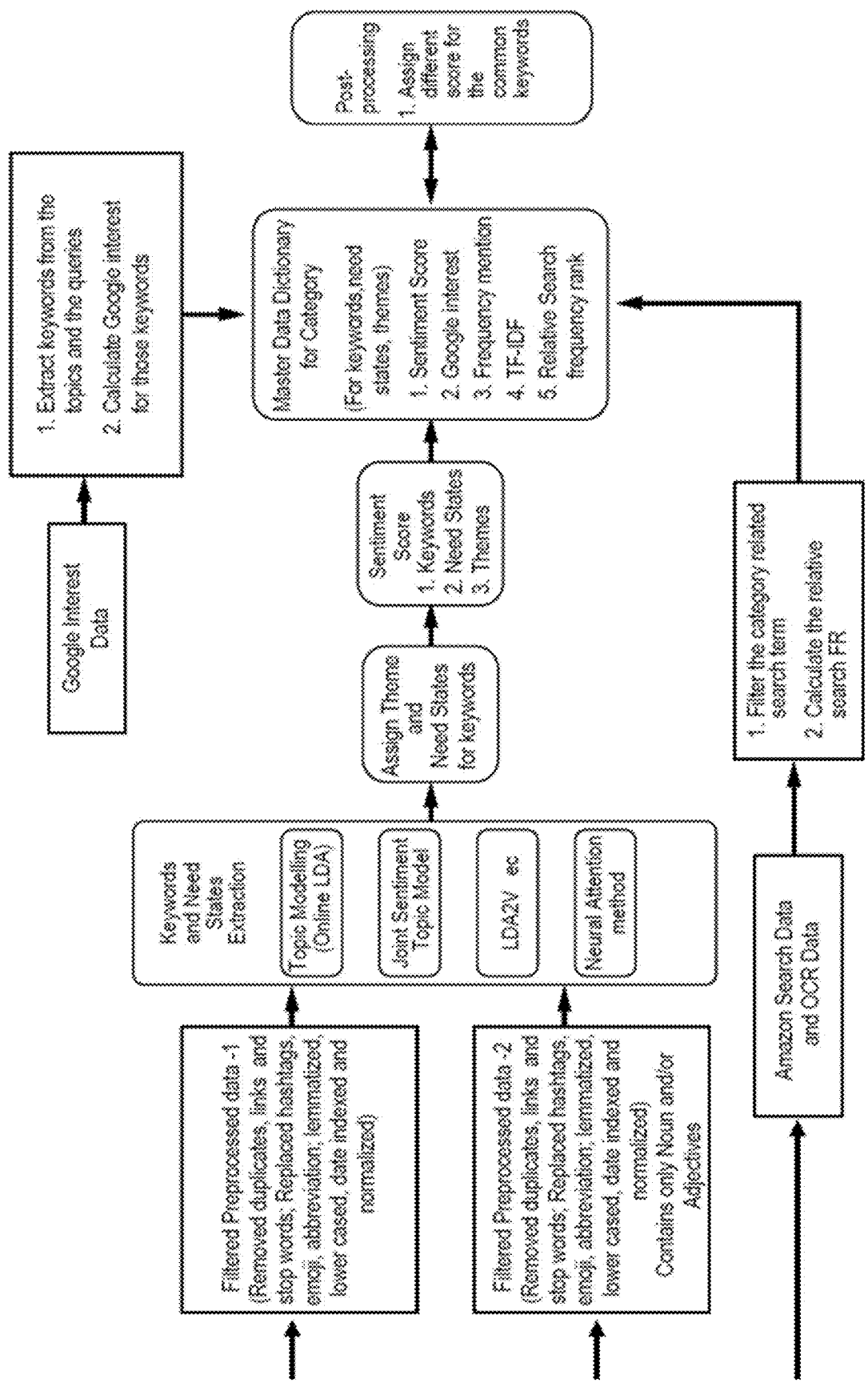

FIG. 1 depicts an exemplary system for insight automation from content data in accordance with one or more embodiments. System 100 may include data processing engine 110, insight engine 120, database server 130, and report engine 140. Data processing engine 110, insight engine 120, database server 130, and report engine 140 may be any type of computer device, including but not limited to a personal computer, a server computer, a series of server computers, a mini computer, and a mainframe computer, or combinations thereof. Data processing engine 110, insight engine 120, database server 130, and report engine 140 may each be a web server (or a series of servers) running a network operating system. Data processing engine 110 connects to one or more external data sources, including online and offline data sources, through one or more networks, including but not limited to, local-area networks (LANs), wide-area networks (WANs), world wide web (WWW), or any combination thereof. The solution architecture of the system for insight automation from content data is depicted in FIG. 2

Data processing engine 110 may comprise data pre-processing module 111, filtering module 112, context extraction module 113, theme segmenting module 114, and sentiment scoring module 115.

Data pre-processing module 111 applies natural language processing (NLP) to process unstructured data for noise removal and text normalization. Data components that are redundant to the core text analytics can be considered as noise and may be removed. Handling multiple occurrences/representations of the same word is called normalization. Text normalization may include a set of tasks comprising tokenization, lemmatization, and sentence segmentation. The task of tokenization is to break up a sequence of strings into pieces such as words, keywords, phrases, symbols and other elements called tokens. In the process of tokenization, some characters like punctuation marks are discarded. For processing tweets or texts, emoticons like :) or hashtags like #nlproc are tokenized. Another part of text normalization is lemmatization, the task of determining that two words have the same root, despite their surface differences. For example, the words sang, sung, and sings are forms of the verb sing. The word sing is the common lemma of these words. Lemmatization is essential for processing morphologically complex languages like Arabic. Stemming refers to a simpler version of lemmatization in which suffixes from the end of the word are stripped. Text normalization also includes sentence segmentation: breaking up a text into individual sentences, using cues like periods or exclamation points.

Data pre-processing module 111 also performs tagging to provide suitable input for the stages of keyword extraction and theme segmentation that follow. The tokenized text may be passed to a part-of speech (PoS) tagger and a parser. The PoS tagger is a software tool that labels words as one of several categories to identify the word's function in a given language. Some current major algorithms for PoS tagging include the Viterbi algorithm, Brill tagger, Constraint Grammar, and the Baum-Welch algorithm (also known as the forward-backward algorithm). Hidden Markov model and visible Markov model taggers can both be implemented using the Viterbi algorithm. Many machine learning methods, such as SVM, maximum entropy classifier, perceptron, and nearest-neighbor, have also been applied to the problem of PoS tagging. Since there is a tendency for keywords to constitute noun or adjective phrases, a parser may be used to find noun or adjective phrases in the text. In at least one embodiment, the data pre-processing module 111 produces two sets of the preprocessed data, one contains all different kinds of phases and the other one contains only noun and adjective phases.

Figure 3:
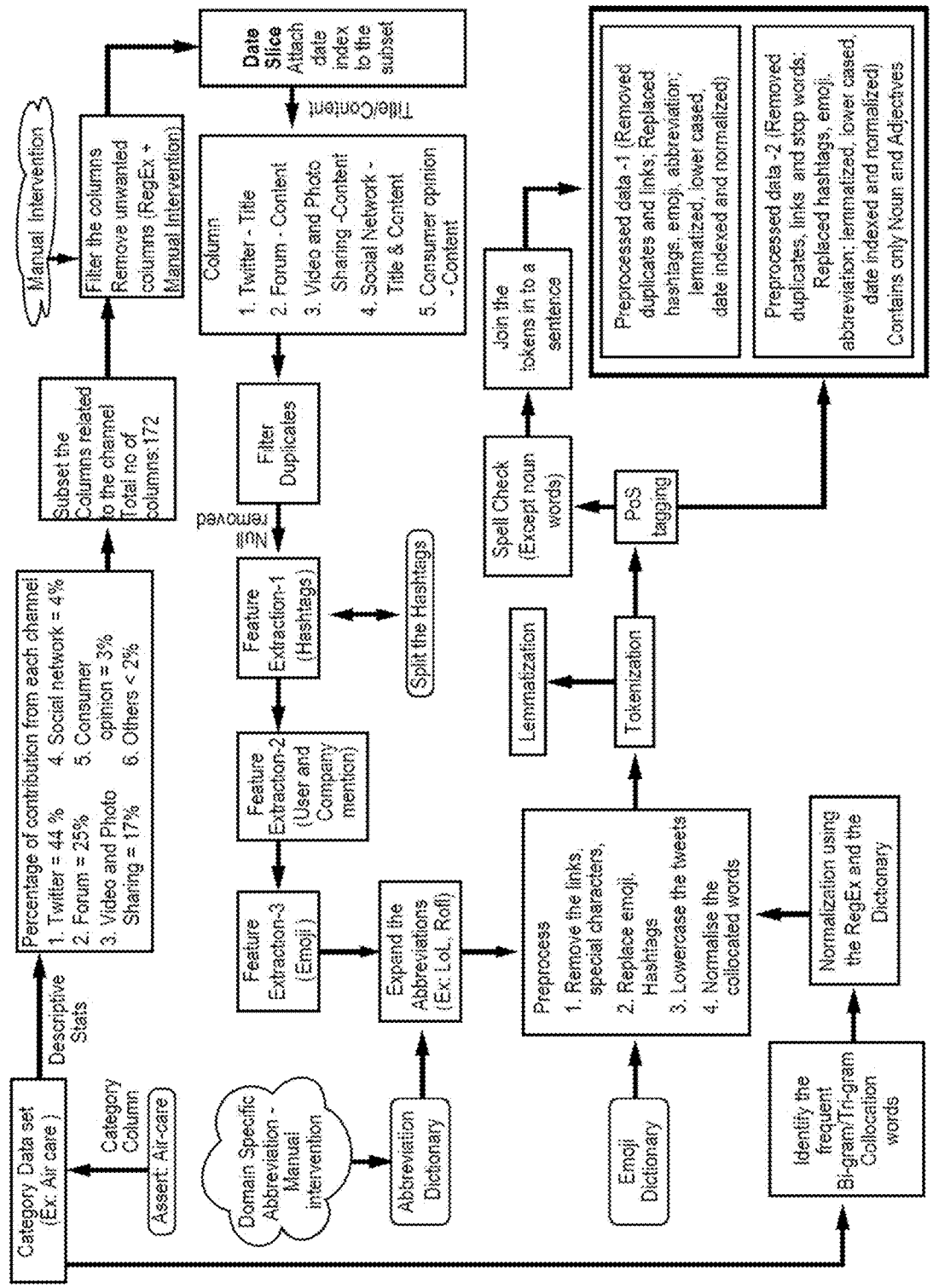
FIG. 3 depicts the architecture of the data pre-processing module.

The descriptions of the detail architecture and process of the data pre-processing module 111 are presented in FIG. 3

Filtering module 112 is coupled to the data pre-processing module 111 to perform a filtering process on the plurality pieces of processed data and to retrieve at least one piece of filtered information. Filtering module 112 is configured to filter the content according to the user request. Filtering module 112 can additionally include filtering the content with the query parameter. Content is preferably filtered before the content is evaluated for relevance, but can alternatively be filtered during or before evaluating content relevance. Content is preferably filtered in response to receipt of a user request. Filtering module 112 preferably includes adjusting a relevance score assigned to each item of content, and then selecting the items according to relative scores. Selection of items may be based on the score of an item satisfying a certain threshold, having the highest scores up to a certain number, matching a certain criteria, by removing results that match another criteria or by any suitable selection technique. Alternatively, filtering module 112 can include sorting the weighted content by any suitable method of filtering the content may be used. Alternatively, filtering module 112 can include sorting the weighted content by relevance to the query parameters. Alternatively, filtering module 112 can include selecting content that satisfies the user settings. However, any other suitable method of filtering the content can be used.

Examples of algorithms used in filtering module 112 include, but not limited to, Regular expression (RegEx) approach, topic modeling, and support vector machine (SVM) algorithms. RegEx approach is one of the "rules" based pattern search method. Topic modeling is a process to automatically identify topics present in a text object and to derive hidden patterns exhibited by a text corpus. It is an unsupervised approach used for finding and observing the bunch of words (called "topics") in large clusters of texts. The exemplary topic modeling approach comprises Latent Dirichlet Allocation (LDA), which is a generative statistical model that allows sets of observations to be explained by unobserved groups that explain why some parts of the data are similar. SVM is a supervised machine learning algorithm with associated learning algorithms that analyze data used for classification and regression analysis. It is mostly used in classification problems. In this algorithm, each data item is plotted as a point in n-dimensional space (where n is number of features), with the value of each feature being the value of a particular coordinate. Then, classification is performed by finding the hyper-plane that best differentiates the two classes.

Figure 4:
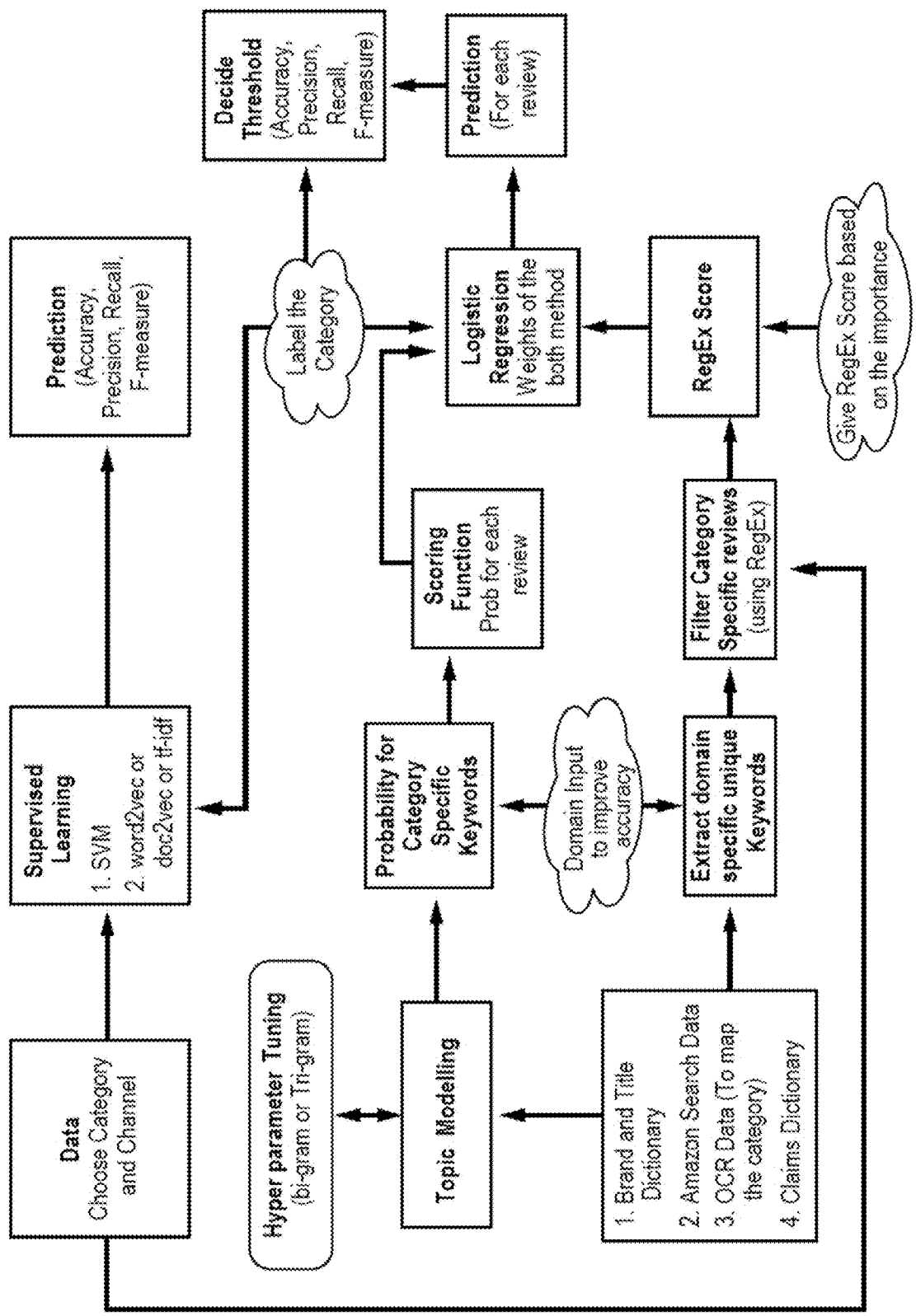
FIG. 4 depicts the architecture of the filtering module.

The descriptions of the detail architecture and the filtering process of the filtering module 112 are presented in FIG. 4.

Keyword extraction module 113 generates one or more keywords in accordance with one embodiment of the present invention. In order to identify which candidate phrases are keywords, an exemplary embodiment employs a classifier that uses the input (filtered preprocessed data) to estimate the probability that the phrase is a keyword and assign a score to the phrase. The classifier function that maps the feature input to a keyword score may be obtained using unsupervised or supervised machine learning algorithms. Both types of algorithms use the concept of a "feature." Features are individual measurable heuristic properties of the phenomena being observed that can be used to create a numerical representation of the phenomena, which are in this case word patterns. Features are individual measurable heuristic properties of the phenomena being observed that can be used to create a numerical representation of the phenomena, which are in this case word patterns.

In one embodiment of the present invention, a supervised learning approach uses a set of features (an n-dimensional "feature vector") that are chosen for their effectiveness in separating desired and undesired entries, and examples of documents together with collections of keywords that have been generated by humans (manually-constructed) are provided as training data to a machine learning algorithm. In another embodiment, an unsupervised method can use similar features selected for their sensitivity to parameters of relevance in ranking keywords, but in the absence of training data, it might use numeric values derived from the feature vectors to perform scoring and ranking of candidate entries. Subsequently, a number of candidate entries to be retained in a keyword collection can be selected using predetermined criteria for quality or for a desired number of entries. Thus the present invention provides both unsupervised and supervised embodiments of an automatic keyword extraction method.

Examples of algorithms and corresponding classifiers used in supervised and unsupervised methods include, but not limited to, LDA2Vec, neural attention method, topic modelling, joint sentiment topic model, and Word2Vec.

In one embodiment of the present invention, TF-IDF (term frequency-inverse document frequency) is used to measure the informativeness of a keyword. TF-IDF is a traditional information retrieval metric, employed in most existing keyword extraction applications. The TF-IDF weight is a weight often used in information retrieval and text mining. This weight is a statistical measure used to evaluate how important a word is to a document in a collection or corpus. The importance increases proportionally to the number of times a word appears in the document but is offset by the frequency of the word in the corpus.

Figure 5:
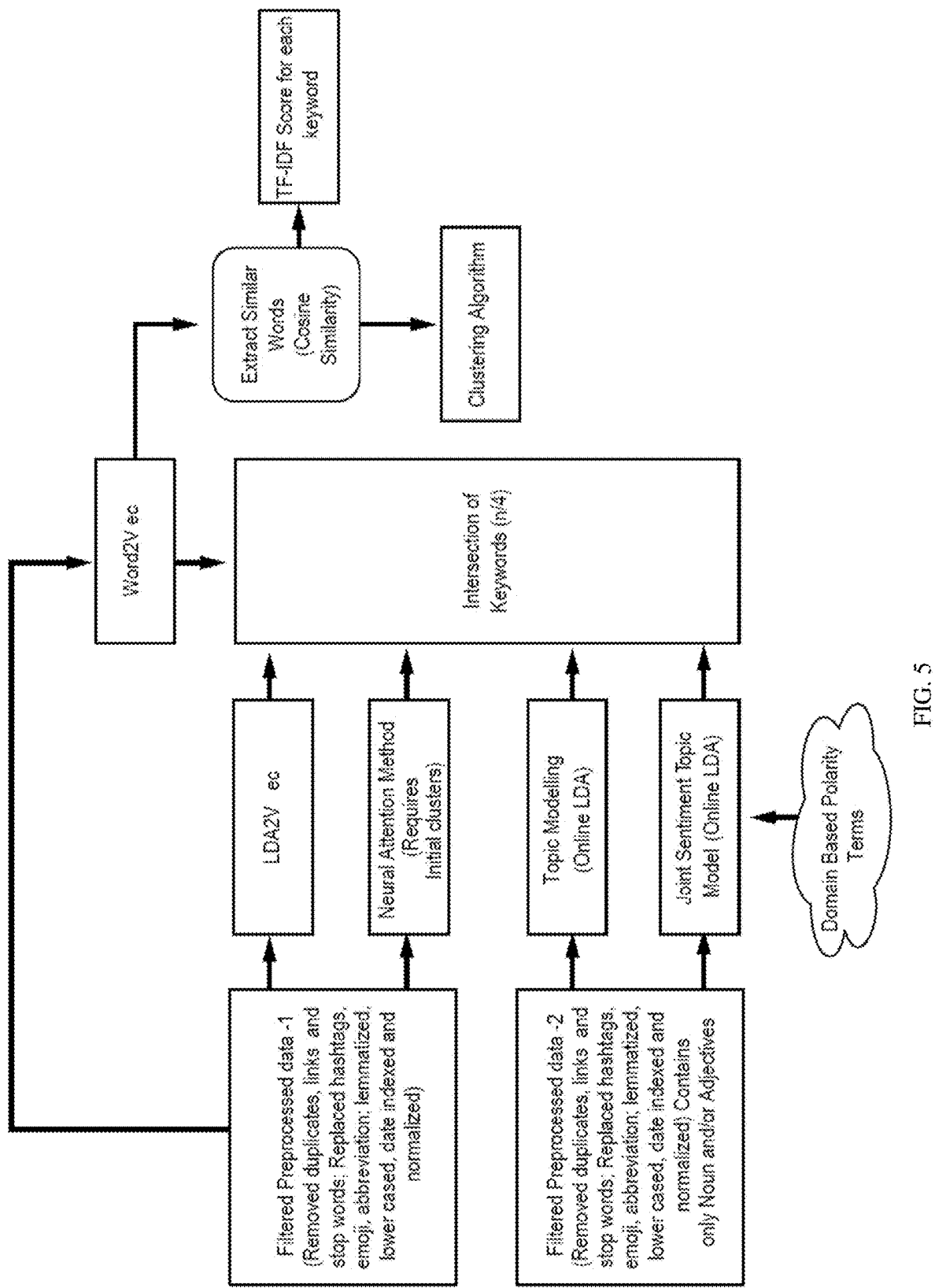
FIG. 5 depicts the architecture of the keyword extraction module.

The descriptions of the detail architecture and process of the keyword extraction module 113 are presented in FIG. 5.

Theme segmenting module 114 may include subsystems to determine themes/need states within a collection of data. Themes generally refer to facets of a broader topic and, accordingly, use of the term "theme" herein is intended to encompass both topics and themes. In one embodiment, an incremental clustering method is used to compare feature vectors created for the incoming posts against centroid feature vectors representative of existing themes and to detect new themes as they emerge. Generally, a centroid feature vector is a feature vector that represents a set of posts associated with a theme. The clustering technique for segmenting themes generally is based on how closely post content resembles, and is contained within, existing themes, while incorporating natural decay of old themes over time. Further, new theme detection is based not only on the uniqueness of content but also on temporal distance from existing themes. The incremental clustering approach described herein emulates the real-time nature of user-generated posts in an online community or network. The data considered for evaluation of cluster-specific features at a particular time can include documents (i.e., content) from an incoming content stream that bear timestamps less than or equal to the prior evaluation time window's end time.

Theme segmenting module 114 is configured to assign user-generated posts to one or more post clusters (themes) based on the similarity calculated by the similarity evaluating component. If sufficient similarity exists (for instance, based on a pre-determined similarity threshold) between the user-generated post and at least one existing theme, theme segmenting module 114 is configured to assign the user-generated post to the at least one theme. If sufficient similarity does not exist between the user-generated post and at least one existing theme, theme segmenting module 114 is configured to create a new theme and the user-generated post becomes the inaugural post assigned to a cluster represented by the new theme.

Theme segmenting module 114 may determine themes/need states using unsupervised techniques. In some embodiments, theme segmenting module 114 may organize themes in a hierarchical structure in which a child theme may belong to a parent theme. In some embodiments, theme segmenting module 114 may suggest one or several categorization rules that represent the concept of the theme such that theme segmenting module 114 may identify whether the theme applies to a portion of unstructured text. In some embodiments, theme segmenting module 114 may suggest a name to identify each determined theme.

Figure 6:
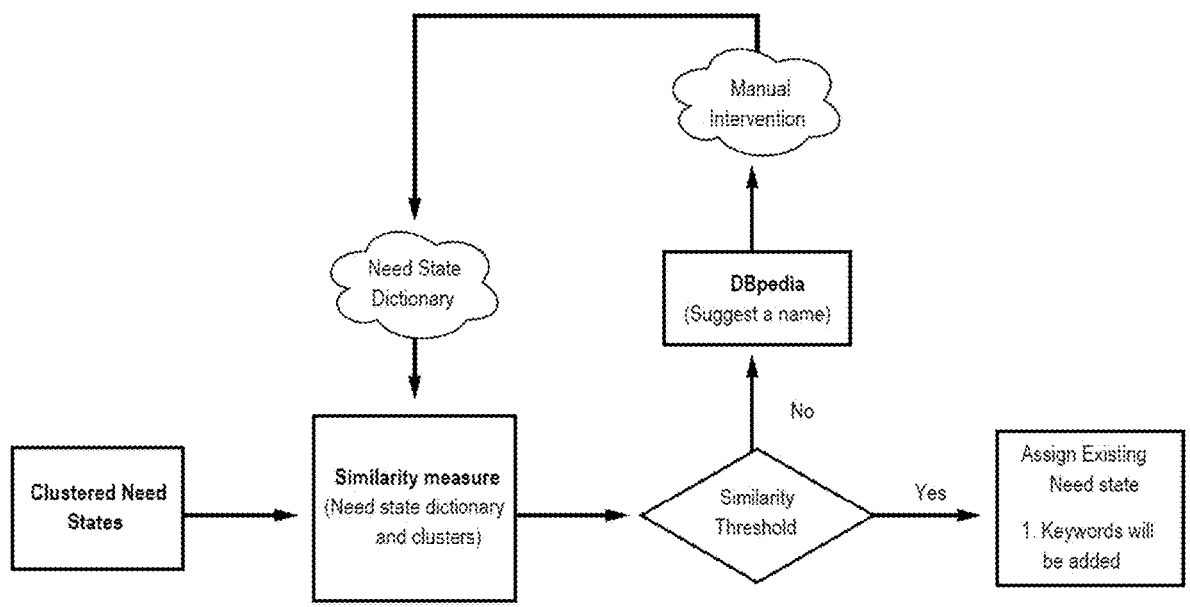
FIG. 6 depicts the architecture of theme segmenting module.

The descriptions of the detail architecture and process of the theme/need states segmenting module 114 are presented in FIG. 6.

Sentiment scoring module 115 is configured to analyze text data and classify opinions as negative, positive or neutral and to assign a sentiment score to the opinions. Sentiment and sentiment score may be derived from computational linguistics and define or represent a tone of an article, blog, social media comment, etc., usually as positive, negative or neutral, with respective scores of +1, −1, and 0, for example. In some embodiments, the sentiment scoring engine may assign a numeric sentiment score on a numeric scale ranging from a minimum value representing the lowest possible sentiment to a maximum value representing the highest possible sentiment. In some embodiments, a dictionary of words is included, in which selected words are pre-assigned a sentiment tuning value.

According to one embodiment, sentiment scoring module 115 is configured to analyze sentiment at the sentence level to obtain the sentiment of a single sentence. Sentiment analysis may apply window-based or rule-based approaches. Window-based sentiment analysis divides each text into a number of segments or windows, each window contains a certain number of words. Rule-based sentiment analysis employs the class association rule mining algorithm to automatically discover interesting and effective rules capable of extracting product features or opinion sentences for a specific product feature interested. The outcome of this study is a set of rules (also known as lexicon or sentiment lexicon) according to which the words classified are either positive or negative along with their corresponding intensity measure.

Figure 7:
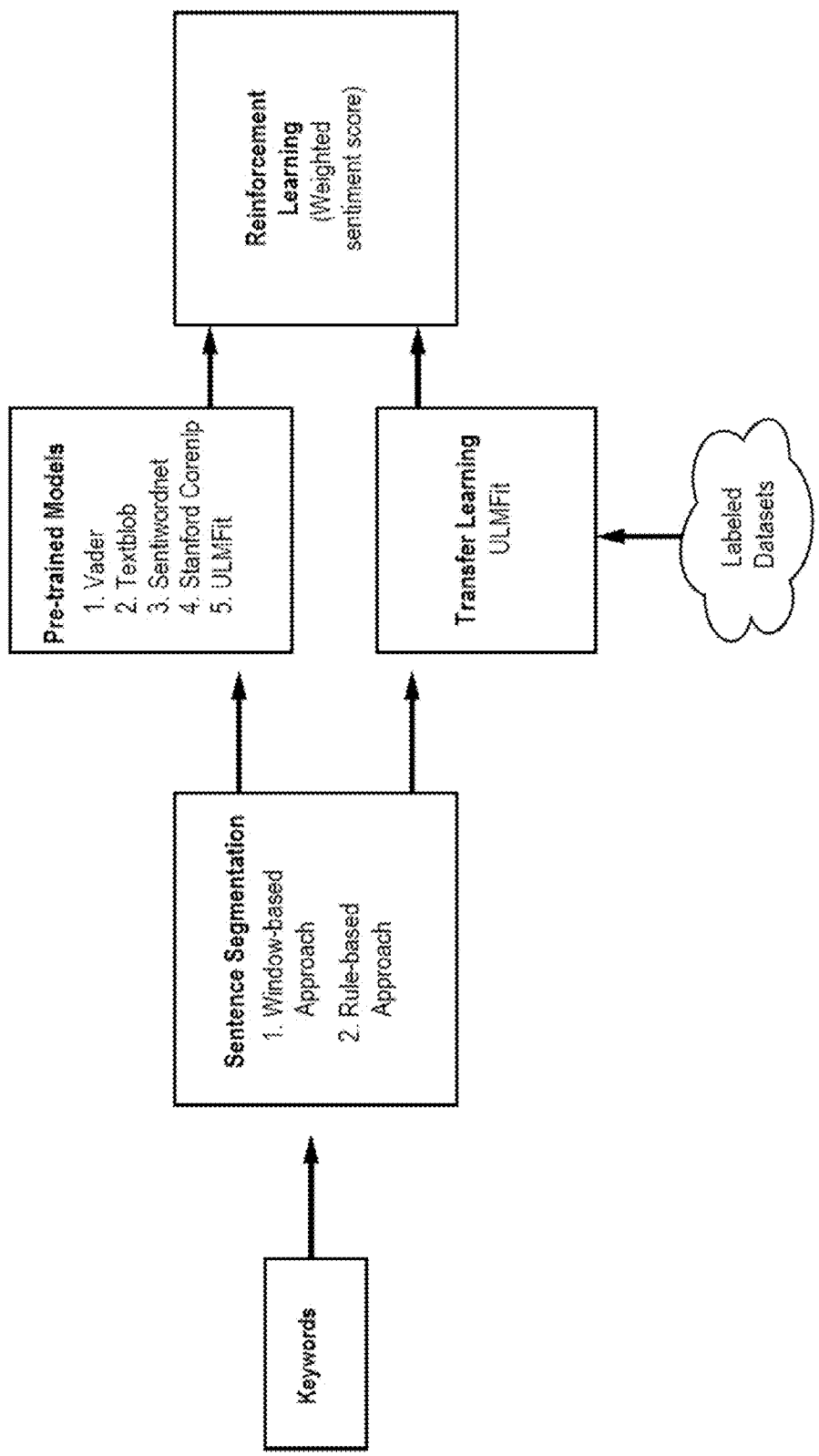
FIG. 7 depicts the architecture of sentiment scoring module.

Sentiment scoring module 115 may include a training module that analyzes past posts/media and the resulting responses in light of certain events to build a pretrained model to predict sentiment given certain types of news or events. The examples of pretrained models include, but not limited to, Vader, Textblob, Sentiwordnet, Standford CoreNLP, and ULMFit. VADER (Valence Aware Dictionary and Sentiment Reasoner) is widely used in analyzing sentiment on social media text because it has been specifically attuned to analyze sentiments expressed in social media. VADER is sensitive to both polarity and the intensity. TextBlob is very useful NLP library that comes prepackaged with its own sentiment analysis functionality. It is also based on NLTK. The sentiment property of the api/library returns polarity and subjectivity. Sentiwordnet is also built into NLTK. It is used for opinion mining. This helps in deducing the polarity information from the given problem instance. SWN extends wordnet which is a lexical database of words (the relationship between words, hence the term net), and is a part of NLTK corpus. Standford CoreNLP includes SentimentAnnotator which implements Socher et al's sentiment model. Universal Language Model Fine-Tuning (ULMFiT) is a method to enable transfer learning for any NLP task and achieve great results The descriptions of the detail architecture and process of the sentiment scoring module 115 are presented in FIG. 7.

Figure 8C:
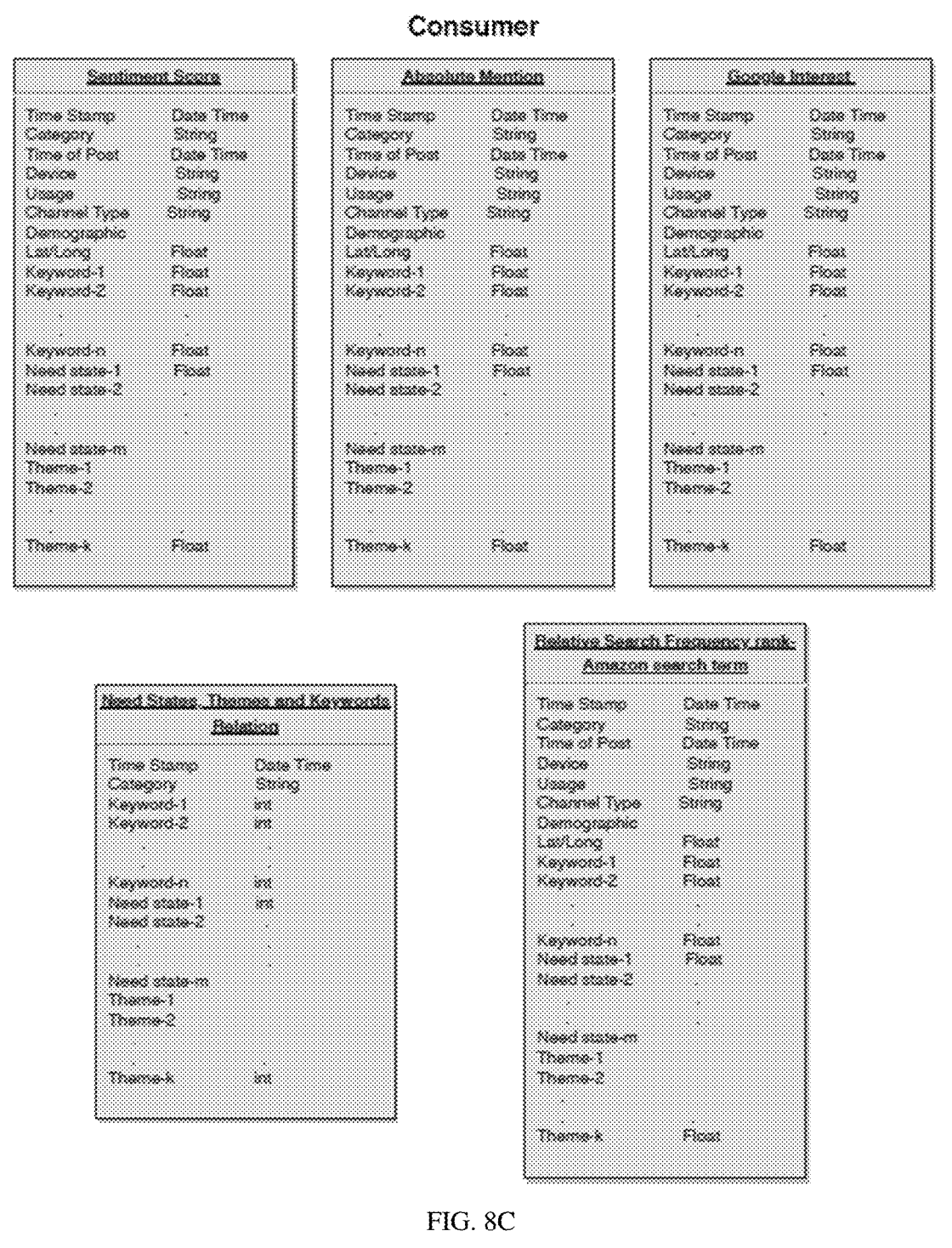

The outputs of the data processing engine 110 is a master data dictionary 131 for category, brand and consumer, respectively. As illustrated in FIGS. 8A-8C, the master data dictionary 131 is a table storing master keyword and theme information of a target, such as category, brand or consumer, and is stored in the database server 130. The master data dictionary 131 associates the keyword information with the theme information in each subcategory including sentiment score, absolution mention, google interest, need states, themes and keywords relation, and relative search frequency rank.

Insight engine 120 is a predictive modeling including a time series model 121 and association rule mining model 122. The input of the insight engine 120 is data schema of master data dictionary 131.

In some embodiments, the insight engine 120 can predict the values of a target at time t and optionally t+1, . . . , t+i, given observations of the target at times before t and optionally observations of other predictor variables P at times before t. In some embodiments, the insight engine 120 partitions past observations to train a supervised learning model, measure its performance, and improve accuracy. In some embodiments, the time series model provides useful time-related predictive features, for example, predicting previous values of the target at different lags. In some embodiments, insight engine 120 refreshes the time series model as time moves forward and new observations arrive, taking into account the amount of new information in such observations and the cost of refitting the model.

Some embodiments may use association rule mining models to automate insight generation. Insight generation may comprise findings of the patterns in the data base and/or determine the scope of the impacting factors. Insights may describe, for example, production innovation through long term association.

Report engine 140 reports the output of insight engine 130. The output of insight engine 130 may comprise emerging, declining, viral and stable trends for themes, keywords and brands; product innovation through long term association; keyword association network; and growth opportunities in the category and brand.

Figure 9:
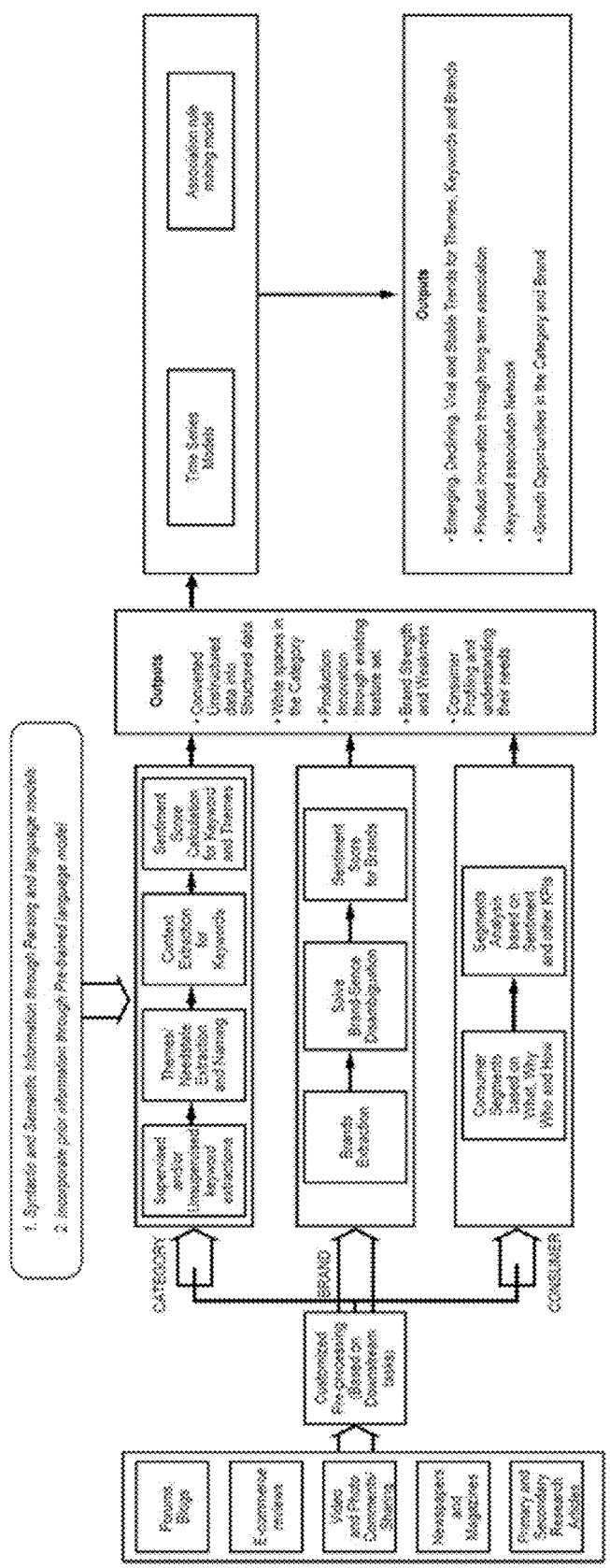
FIG. 9 depicts the workflow of the system for insight automation from content data.

FIG. 9 depicts the solution architecture of the invented system. The input signals, contents derived from a plurality of media source sites, are pre-processed and cleaned based on downstream targets. The downstream targets include but not limited to identifying a "category" of products, a "brand", and a "consumer".

It is to be understood that the above described embodiments are merely illustrative of numerous and varied other embodiments which may constitute applications of the principles of the invention. Such other embodiments may be readily devised by those skilled in the art without departing from the spirit or scope of this invention and it is our intent they be deemed within the scope of our invention.

The invention claimed is:

1. A system for insight automation from content data, comprising:
    a non-transitory computer-readable storage medium comprising instructions that, when executed, enable a computing system to automatically generate insights from the content data, wherein the instructions comprises:
    a data processing engine configured to receive the content data from a plurality of external data sources, the data processing engine comprising:
        a data preprocessing module configured to process unstructured content data using natural language processing algorithms to generated preprocessed data;
        a filtering module configured to filter the preprocessed data to retrieve filtered preprocessed data;
        a keyword extraction module configured to extract a plurality of keywords from the filtered preprocessed data;
        a theme segmenting module configured to determine a theme within a collection of the filtered preprocessed data; and
        a sentiment scoring module configured to classify opinions derived from the filtered preprocessed data and assign a sentiment score to the opinions;
    wherein the data processing engine generate a master data dictionary stored in a database server;
    an insight engine configured to receive data schema of the master data dictionary and generate insights using a time series model and association rule mining module; and
    a reporting engine configured to report the insights generated by the insight engine.

2. The system of claim 1, wherein the data pre-processing module comprises noise removal, text normalization, and part-of-speech tagging.

3. The system of claim 1, wherein the filtering module is configured to use one or more algorithms comprising Regular expression (RegEx) approach, topic modeling, and support vector machine (SVM) algorithms.

4. The system of claim 1, wherein the keyword extraction module is configured to use one or more algorithms selecting from a group comprising LDA2Vec, neural attention method, topic modelling, joint sentiment topic model, and Word2Vec.

5. The system of claim 4, wherein informativeness of a keyword is determined by term frequency-inverse document frequency (TF-IDF).

6. The system of claim 1, wherein the theme segmenting module uses an incremental clustering method.

7. The system of claim 1, wherein the sentiment scoring module is configured to analyze sentiment at a sentence level to obtain a sentiment of a single sentence.

8. The system of claim 1, wherein the sentiment scoring module applies window-based or rule-based approaches.

9. The system of claim 1, wherein the sentiment scoring module is configured to build a pretrained model to predict sentiment.

10. A method for insight automation from content data, comprising
    receiving, via a data processing engine, the content data from a plurality of external data sources;
    processing, via a data pre-processing module, unstructured content data using natural language processing algorithms to generated preprocessed data;
    filtering, via a filtering module, the preprocessed data to retrieve filtered preprocessed data;
    extracting, via a keyword extraction module, a plurality of keywords from the filtered preprocessed data;
    determining, via a theme segmenting module, a theme within a collection of the filtered preprocessed data;
    classifying, via a sentiment scoring module, opinions derived from the filtered preprocessed data and assigning a sentiment score to the opinions;
    generating a master data dictionary stored in a database server;
    generating, via an insight engine, insights from data schema of the master data dictionary using a time series model and association rule mining module; and
    reporting, via a reporting engine, the insights.

11. The method of claim 10, wherein the data pre-processing module comprises noise removal, text normalization, and part-of speech tagging.

12. The method of claim 10, wherein the filtering module is configured to use one or more algorithms comprising Regular expression (RegEx) approach, topic modeling, and support vector machine (SVM) algorithms.

13. The method of claim 10, wherein the keyword extraction module is configured to use one or more algorithms selected from a group comprising LDA2Vec, neural attention method, topic modelling, joint sentiment topic model, and Word2Vec.

14. The method of claim 13, wherein informativeness of a keyword is determined by term frequency-inverse document frequency (TF-IDF).

15. The method of claim 10, wherein the theme segmenting module uses an incremental clustering method.

16. The method of claim 10, wherein the sentiment scoring module is configured to analyze sentiment at a sentence level to obtain a sentiment of a single sentence.

17. The method of claim 10, wherein the sentiment scoring module applies window-based or rule-based approaches.

18. The method of claim 10, wherein the sentiment scoring module is configured to build a pretrained model to predict sentiment.

* * * * *